(12) United States Patent
Karanam et al.

(10) Patent No.: US 12,183,019 B2
(45) Date of Patent: Dec. 31, 2024

(54) SYSTEMS AND METHODS FOR HUMAN MODEL RECOVERY

(71) Applicant: Shanghai United Imaging Intelligence Co., Ltd., Shanghai (CN)

(72) Inventors: Srikrishna Karanam, Bangalore (IN); Meng Zheng, Cambridge, MA (US); Ziyan Wu, Lexington, MA (US)

(73) Assignee: Shanghai United Imaging Intelligence Co., Ltd., Shanghai (CN)

( * ) Notice: Subject to any disclaimer, the term of this patent is extended or adjusted under 35 U.S.C. 154(b) by 71 days.

(21) Appl. No.: 17/994,696

(22) Filed: Nov. 28, 2022

(65) Prior Publication Data

US 2024/0177326 A1 May 30, 2024

(51) Int. Cl.
*G06T 7/50* (2017.01)
*G06N 3/02* (2006.01)

(52) U.S. Cl.
CPC ............... *G06T 7/50* (2017.01); *G06N 3/02* (2013.01); *G06T 2207/20084* (2013.01)

(58) Field of Classification Search
CPC .......... G06T 7/50; G06T 13/20; G06T 19/20; G06T 2200/24; G06T 2210/41; G06T 2219/2016; G06T 2219/2021; G06T 2207/20084; G06T 7/75; G06T 17/00; G06N 3/02; G06N 3/045; G06N 3/04; G06N 3/08; G16H 10/60; G16H 50/20; G16H 30/40; G06V 10/462; G06V 10/82; G06V 40/103
See application file for complete search history.

(56) References Cited

U.S. PATENT DOCUMENTS

| | | | |
|---|---|---|---|
| 11,941,738 B2* | 3/2024 | Karanam | G16H 50/20 |
| 2020/0293174 A1* | 9/2020 | Diaz | G06Q 10/06316 |
| 2020/0294677 A1* | 9/2020 | Godinho | G16H 50/50 |
| 2021/0118173 A1 | 4/2021 | Wu et al. | |
| 2021/0232924 A1* | 7/2021 | Sun | G06V 10/82 |
| 2023/0316686 A1* | 10/2023 | Moodley | G16H 50/20 |
| | | | 345/419 |

* cited by examiner

Primary Examiner — Vijay Shankar
(74) Attorney, Agent, or Firm — Zhong Law, LLC

(57) ABSTRACT

A human model such as a 3D human mesh may be generated for a person in a medical environment based on one or more images of the person. The images may be captured using a sensing device that may be attached to an existing medical device such as a medical scanner in the medical environment. Such an arrangement may ensure that unblocked views of the person (e.g., body keypoints of the person) may be obtained and used to generate the human model. The position of the medical device in the medical environment may be determined and used to facilitate the human model construction such that the pose and body shape of the person in the medical environment may be accurately represented by the human model.

18 Claims, 4 Drawing Sheets

SYSTEMS AND METHODS FOR HUMAN MODEL RECOVERY

BACKGROUND

Three-dimensional (3D) patient models that realistically reflect a patient's body shape and pose can be used in a variety of medical applications including patient positioning, treatment planning, surgical navigation, etc. For example, in radiation therapy and medical imaging, success often hinges upon the ability to place and maintain the patient in a desirable position so that the treatment or scan can be performed in a precise and accurate manner. Having knowledge (e.g., visual knowledge) about the patient's physical characteristics in those situations is therefore crucial to obtaining optimal outcome for the patient. Conventional patient modeling techniques assume that substantial portions of a human body are visible (e.g., un-occluded) and can be used to infer the shape and pose of the human body. In many medical environments, however, a patient's body is often blocked, at least partially, by medical equipment and/or clothing items (e.g., hospital gowns, covering sheets, etc.) and, as such, the conventional modeling techniques may not produce satisfactory results. New or improved patient modeling techniques capable of accurately depicting a patient's physical characteristics are therefore desirable.

SUMMARY

Described herein are systems, methods and instrumentalities associated with recovering a human model of a person based on one or more images of the person. A system configured to perform the human model recovery task may include a sensing device (e.g., a camera, a depth sensor, or a non-visible-light sensor) and a processing unit (e.g., which may be a part of the sensing device or separate from the sensing device). The sensor may be configured to be attached to a medical device installed in a medical environment and capture at least a first image of the person in the medical environment while the medical device is in a first position. The processing unit may be configured to obtain the first image captured by the sensing device, identify a first set of body keypoints of the person in the first image, and generate a human model of the person based on at least the first set of body keypoints of the person identified in the first image and the first position of the medical device in the medical environment. The human model may be, for example, a parametric or non-parametric 3D mesh of the person and may indicate a pose and a body shape of the person in the medical environment.

In examples, the sensing device may be further configured to capture a second image of the person while the medical device is in a second position. The processing unit may be further configured to obtain the second image of the person captured by the sensing device, identify a second set of body keypoints of the person in the second image, and generate the human model further based on the second set of body keypoints of the person. In examples, the processing unit may be configured to implement a machine learning model for identifying the first and/or second sets of body keypoints of the person and for generating the human model of the person based on the first and/or second sets of body keypoints.

In examples, the human model may include parameters (e.g., pose and/or shape parameters) determined based on a coordinate system associated with the medical environment, and the human model of the person may be generated based on three-dimensional (3D) coordinates of the first set of body keypoints and/or the 3D coordinates of the second set of body keypoints in the coordinate system associated with the medical environment. The 3D coordinates of the first and/or second sets of body keypoints may be respectively determined, for example, based on locations of the first and/or second sets of body keypoints in the first and/or second images, and the first and/second positions of the medical device in the medical environment.

In examples, the processing unit described herein may be configured to receive information regarding the medical device and determine the first and/or second positions of the medical device in the medical environment based on the received information. In examples, the processing unit may be further configured to generate, based on the human model of the person, instructions for adjusting the medical device or a position of the person.

BRIEF DESCRIPTION OF THE DRAWINGS

A more detailed understanding of the examples disclosed herein may be had from the following description, given by way of example in conjunction with the accompanying drawing.

DETAILED DESCRIPTION

The present disclosure is illustrated by way of example, and not by way of limitation, in the figures of the accompanying drawings.

Figure 1:
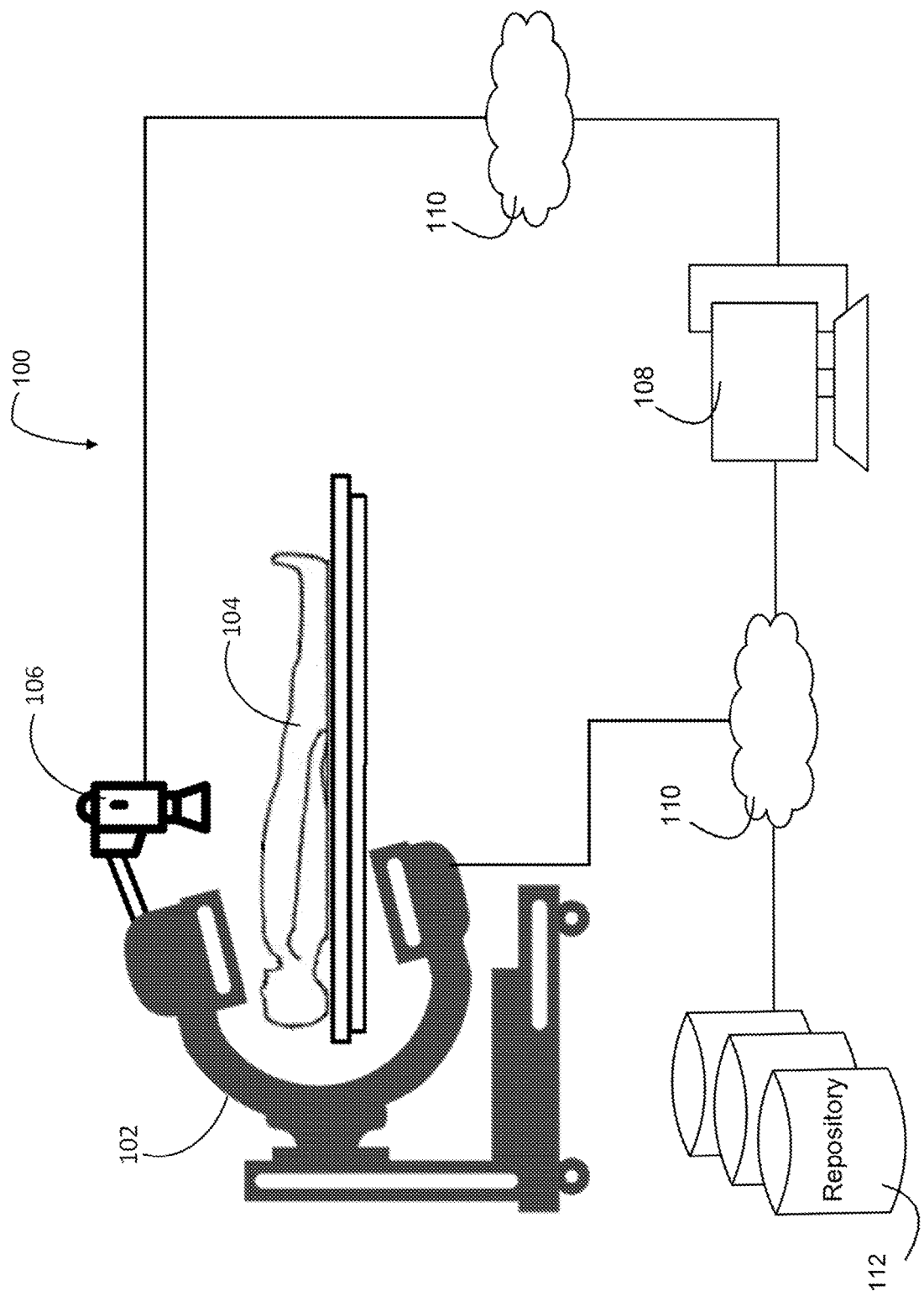
FIG. 1 is a simplified block diagram illustrating an example of a system in accordance with one or more embodiments of the present disclosure.

FIG. 1 is a diagram illustrating an example system 100 that may utilize one or more of the techniques described herein to recover (e.g., construct) a human model. System 100 may be part of a medical environment such as a scan room or an operating room (OR), and may include one or more medical, computing, sensing, data storage, and/or communication devices. For example, system 100 may include a medical device such as a medical scanner 102 configured to capture medical images of a person (e.g., patient 104 shown in FIG. 1) in accordance with an imaging protocol prescribed by a medical professional. The medical scanner 102 may be, for example, an X-scanner (e.g., with a C-arm), a computed tomography (CT) scanner, a magnetic resonance imaging (MRI) machine, a positron emission tomography (PET) scanner, and/or the like that may be positioned in or moved about the medical environment in order to obtain a clear view of the patient 104 (e.g., a target scan area of the patient 104). System 100 may also include a sensing device 106 (e.g., an image capturing device) that may be configured to capture images of the patient 104 while the patient is in a certain position (e.g., standing in front of the medical scanner 102, lying down on a scan bed or surgery table, etc.). The sensing device 106 may include a camera such as a two-dimensional (2D) camera or a 3D camera, a red, green, and blue (RGB) sensor, a depth sensor, a RGB plus depth (RGB-D) sensor, a non-visible light sensor such as a thermal sensor (e.g., an infrared (FIR) or near-infrared (NIR) sensor), a pressure sensor (e.g., attached to a patient bed), or a radar sensor, etc. Depending on the type of sensor(s) included in the sensing device 106, different types of images of the patient 104 may be captured using the sensing device 106, which may include, for example, RGB pictures of the patient, depth images of the patient, radar images of the patient, etc.

The sensing device 106 may be configured to be attached to (or installed on) the medical scanner 102 (e.g., to the C-arm of an X-ray scanner as shown in FIG. 1) so as to capture one or more images or pictures (e.g., RGB pictures) of the patient 104 while the patient is in a certain position. The sensing device 106 may be programmed to take the images or pictures of the patient 104 based on a schedule or time interval, or in response to receiving a command from a controller, which may be a computer or a mobile device. Since the sensing device 106 may be attached to the medical scanner 102, which may be positioned close to the patient's body and have a lower chance of being blocked by another object or device, the images or pictures captured by the sensing device 106 may be free of obstruction or occlusion (e.g., compared to installing or placing the sensing device 106 at a fixed location such as from a ceiling that may be farther away from the patient's body). Moreover, since the medical scanner 102 may be mobile rather than stationary within the medical environment, even if the patient body is partially or entirely blocked by another object or device while the medical scanner 102 is in a first position, a clear picture of the patient may still be captured when the medical scanner 102 is moved a second position, where an unblocked view of the patient's body may be obtained. In addition, since the position (e.g., 3D coordinates) of the medical scanner 102 (e.g., the position of a C-arm to which the sensing device may be attached) in a coordinate system associated with the medical environment (e.g., referred to herein as a global coordinate system) may be determined, e.g., based on information provided by a control unit of the medical scanner, the position (e.g., 3D coordinates) of a body keypoint (e.g., a joint location) of the patient 104 may also be determined in the global coordinate system based on the position of the medical scanner 102 in the global coordinate system, the position of the body keypoint in a coordinate system associated with the sensing device 106 (e.g., referred to herein as a local coordinate system), and/or a relationship between the two coordinate systems. The position of the body keypoint may then be used to recover a human model of the patient 104 that may indicate a pose and a body shape of the patient 104 in the medical environment (e.g., the human model may be generated with respect to the global coordinate system associated with the medical environment rather than the local coordinate system associated with the sensing device 106).

Accordingly, in some embodiments of the present disclosure, the sensing device 106 may be attached to medical scanner 102 and capture at least a first image of the patient 104 in the medical environment while the medical scanner 102 is in a first position. The sensing device 106 may include a processing unit (e.g., comprising one or more processors) configured to process the first image, or the sensing device 106 may be configured to transmit the first image to a separate processing unit 108 (e.g., which may also be a part of the system 100) for processing. In either case, the processing unit may be configured to obtain the first image captured by the sensing device, identify a first set of body keypoints (e.g., joint locations) of the patient 104 in the first image, and generate a human model of the patient 104 based on the first set of body keypoints of the patient and the first position of the medical scanner 102 in the medical environment. In examples, the sensing device 106 may be further configured to capture a second image of the patient 104 while the medical scanner 102 is in a second position, and the processing unit (e.g., the internal processing unit of the sensing device 106 or the external processing unit 108) may be further configured to identify a second set of body keypoints of the patient 104 in the second image, and generate the human model of the patient 104 further based on the second set of body keypoints of the patient 104 in the medical environment.

In examples, the processing unit may be configured to determine the coordinates (e.g., 3D coordinates) of the first set of body keypoints and the coordinates (e.g., 3D coordinates) of second set of body keypoints of the patient 104 in the global coordinate system of the medical environment, and generate the human model based on the determined coordinates. In example, the 3D coordinates of the first and second sets of body keypoints may be respectively determined based on the 2D coordinates of the first and second sets of body keypoints in the first and second images, and the first and second positions of the medical scanner 102 at which the first and second images of the patient 104 are captured. In this way, different pictures of the patient 104 may be obtained (e.g., from different viewing angles) to increase the chance that the body keypoints of the patient 104 used to recover the human model may be visible (e.g., unblocked and un-occluded) in at least some of the pictures to improve the accuracy of human model recovery. Further, the 3D locations of the body keypoints (e.g., 3D joint locations) in the global coordinate system may be determined utilizing knowledge about the position of the medical scanner 102 in the global coordinate system, thus allowing the recovery of a 3D human model (e.g., a parametric or non-parametric mesh) in the global coordinate system that may indicate the pose and/or body shape of the patient 104 in the medical environment rather than just in the local coordinate system that may be patient or camera-centered (e.g., without a global perspective).

Once recovered, the human model may be used for various clinical purposes including, for example, generation of instructions for adjusting the medical scanner 102 (e.g., the height or orientation of the medical scanner, a radiation dose, etc.) and/or a position of the patient 104 (e.g., relative to the medical scanner 102) to comply with one or more predetermined protocols (e.g., to align the center of a target scan area to an image center). The human model may also be used to align a medical scan image of an anatomical structure of the patient 104 (e.g., captured by the medical scanner 102) with the anatomical structure of the patient 104 in the human model, to register one medical scan image of the patient 104 with another medical scan image of the patient, etc.

In examples, the first and second sets of body keypoints of the patient 104 may be respectively identified from the first and second images based on analytical computation or based on a machine learning model that may be learned and/or implemented using an artificial neural network (ANN). In examples, the system 100 may further include a communication link 110 (e.g., a wired or wireless communication link) over which medical scanner 102, sensing device 106, and processing unit 108 may exchange information (e.g., images, model parameters, control instructions, etc.). In examples, the processing unit 108 (or the internal processing unit of the sensing device 106) may receive information from the medical scanner 102 (e.g., a controller of the medical scanner 102) and determine the position of the medical scanner 102 (e.g., the rotation and/or translation of each joint of a C-arm) in the medical environment based on the information. In examples, the system 100 may additionally include a medical record repository 112 configured to store the medical images captured by the medical scanner 102, pictures of the patient 104 captured by the sensing device 106, the human model generated by the processing unit 108, and/or other demographic or medical information (e.g., a medical history) of the patient 104.

Figure 2:
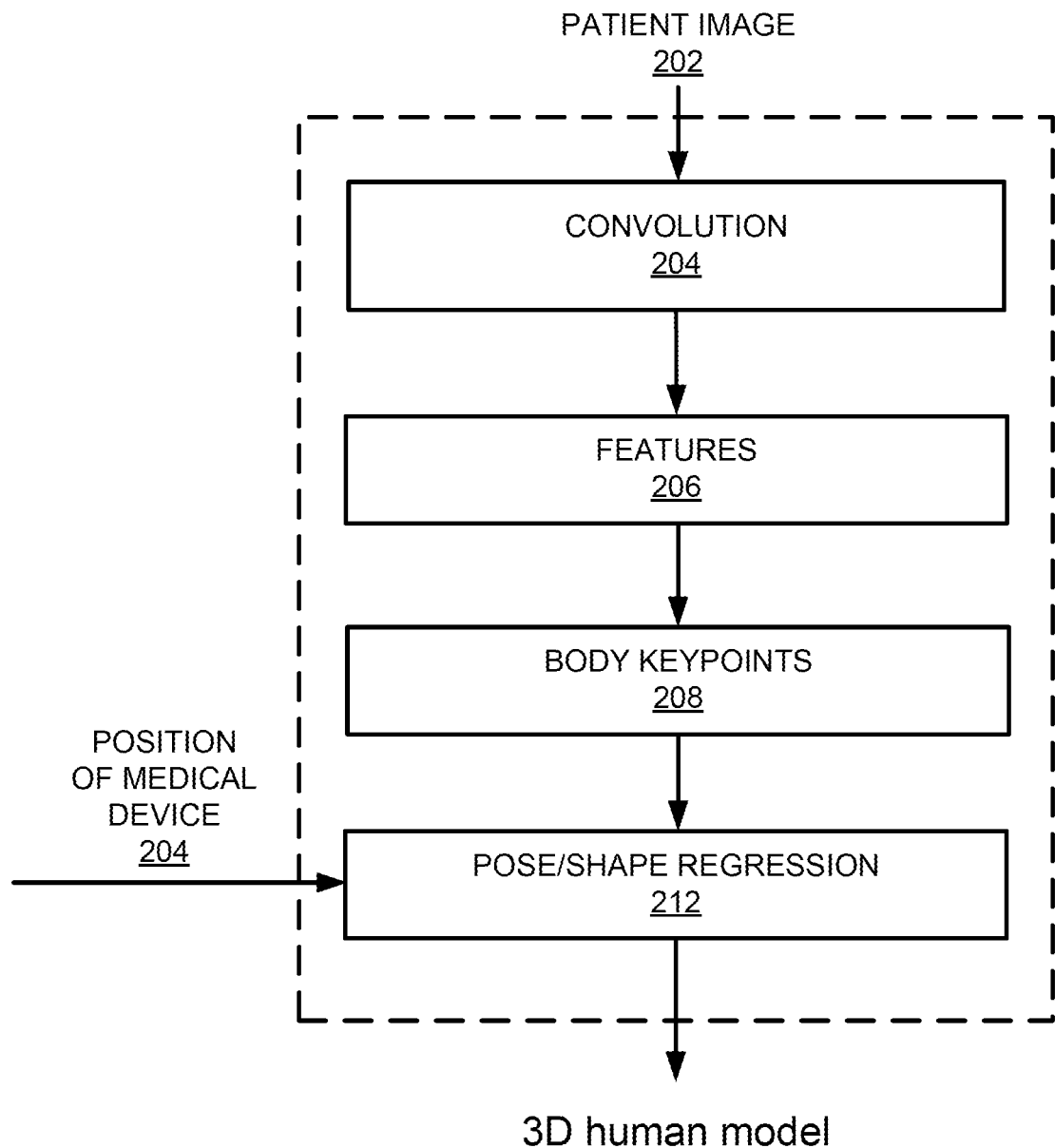
FIG. 2 is a diagram illustrating example techniques for recovering a 3D human model based on a patient image and/or a position of a medical device.

FIG. 2 illustrates example techniques for recovering (e.g., constructing) a 3D human model based on a patient image 202 and/or a position 204 of a medical device. As described herein, the patient image 202 may be captured using a sensing device (e.g., the sensing device 106 of FIG. 1) attached to the medical device (e.g., the medical scanner 102 of FIG. 1), and may include an RGB, depth, and/or thermal image of the patient. The patient image 202 may be provided as an input to a neural network such as a convolutional neural network that may be trained to extract, through a set of convolution operations 204, features from the patient image 202 that may be associated with one or more body keypoints 208 (e.g., joint locations) of the patient. The features may be represented by a feature vector or a feature map 206, and may indicate the respective locations of the one or more body keypoints 208 of the patient (e.g., the respective locations of the body keypoints 208 in the patient image 202). In examples, the location of each body keypoint 208 in the patient image 202 may be represented by 2D coordinates of the body keypoint in the coordinate system of the patient image 202, and the 2D coordinates may be determined based on the location of the pixel area that may contain the extracted features of the body keypoint.

The neural network described herein may include multiple layers including, for example, an input layer, one or more convolutional layers, one or more pooling layers, one or more fully connected layers, and/or an output layer. Each of the convolutional layers may include a plurality of filters (e.g., kernels) designed to detect (e.g., extract) the features 206 from the patient image 202. The filters may be associated with respective weights that, when applied to an input, produce an output indicating whether a specific feature is detected. As described herein, the features 206 extracted through the aforementioned convolution operations may be used to determine a plurality of body part locations (e.g., joint locations) of the patient. For example, the features 206 may be used to identify 23 joint locations of a skeletal rig of the patient as well as a root joint of the patient, from which 72 pose-related parameters $\theta$ (e.g., 3 parameters for each of the 23 joints and 3 parameters for the root joint) may be inferred. The patient image 202 may also be used to determine a set of shape parameters $\beta$ that may represent a body shape of the patient. For example, a principal component analysis (PCA) of the patient image 202 may be performed to derive a set of PCA coefficients, and the first 10 coefficients of the PCA space may be used as the shape parameters $\beta$. The pose parameters $\theta$ and the shape parameters $\beta$ may then be used, together with position 204 of the medical device, to estimate the patient's pose and body shape, for example, based on a statistical body shape model such as a skinned multi-person linear model (SMPL). In examples, the pose and shape parameters may be used to determine a plurality of vertices (e.g., 6890 vertices based on 72 pose parameters and 10 shape parameters) for constructing a 3D mesh of the human body, for example, by connecting multiple vertices with edges to form a polygon (e.g., such as a triangle), connecting multiple polygons to form a surface, using multiple surfaces to determine a 3D shape, and applying texture and/or shading to the surfaces and/or shapes.

Figure 3:
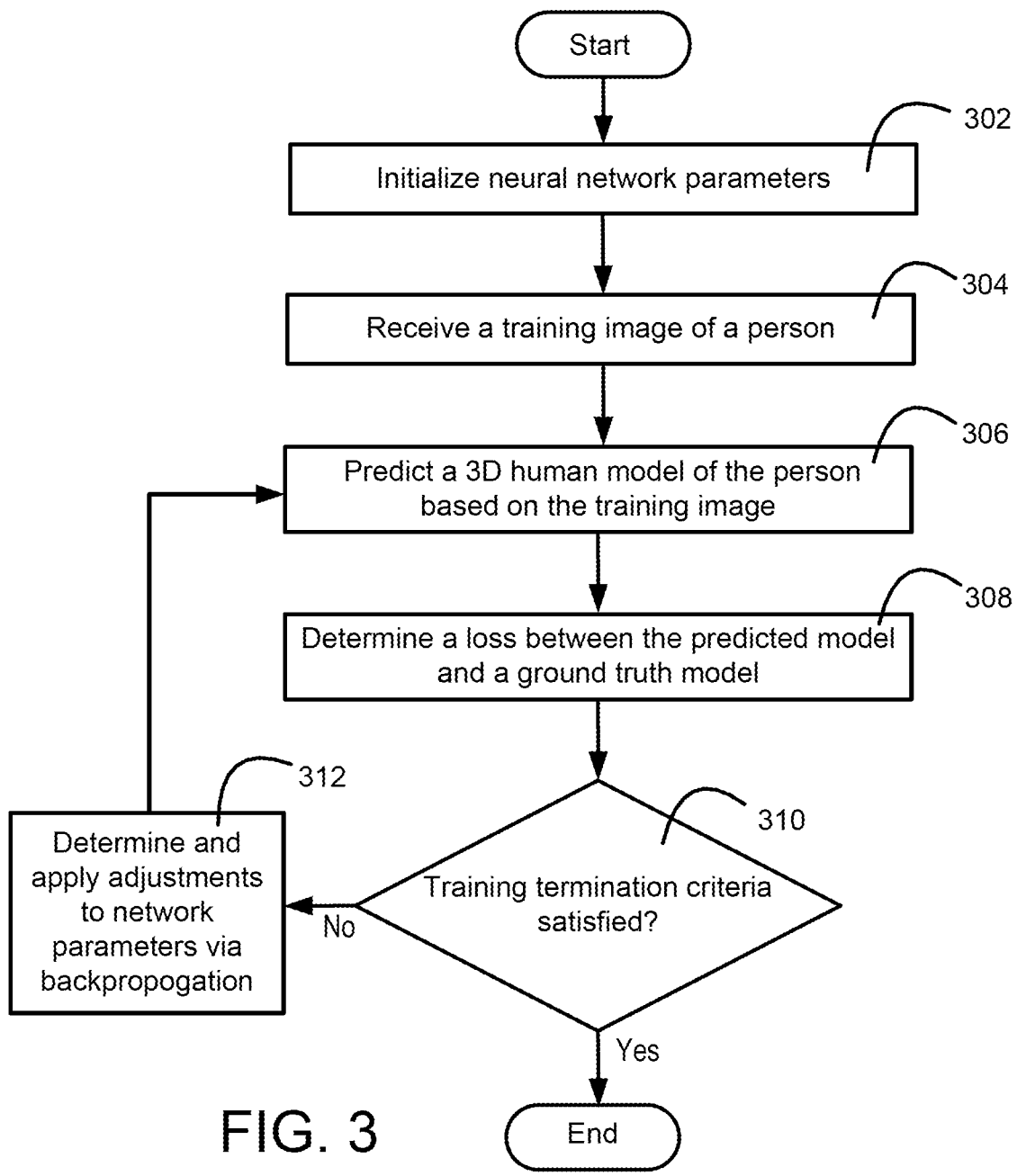
FIG. 3 is flow diagram illustrating example operations that may be associated with training a neural network for performing one or more of the tasks described herein.

FIG. 3 illustrates example operations that may be associated with training a neural network (e.g., an ML model implemented by the neural network) for performing one or more of the tasks described herein. As shown, the training operations may include initializing the operating parameters of the neural network (e.g., weights associated with various layers of the neural network) at 302, for example, by sampling from a probability distribution or by copying the parameters of another neural network having a similar structure. The training operations may further include processing an input (e.g., a training image) using presently assigned parameters of the neural network at 304, and making a prediction for a desired result (e.g., a feature vector, pose and/or shape parameters, a human model, etc.) at 306. The prediction result may then be compared to a ground truth at 308 to determine a loss associated with the prediction based on a loss function such as mean squared errors between the prediction result and the ground truth, an L1 norm, an L2 norm, etc. The loss thus calculated may be used to determine, at 310, whether one or more training termination criteria are satisfied. For example, the training termination criteria may be determined to be satisfied if the loss is below a threshold value or if the change in the loss between two training iterations falls below a threshold value. If the determination at 310 is that the termination criteria are satisfied, the training may end; otherwise, the presently assigned network parameters may be adjusted at 312, for example, by backpropagating a gradient descent of the loss function through the network before the training returns to 306.

For simplicity of explanation, the training steps are depicted and described herein with a specific order. It should be appreciated, however, that the training operations may occur in various orders, concurrently, and/or with other operations not presented or described herein. Furthermore, it should be noted that not all operations that may be included in the training process are depicted and described herein, and not all illustrated operations are required to be performed.

Figure 4:
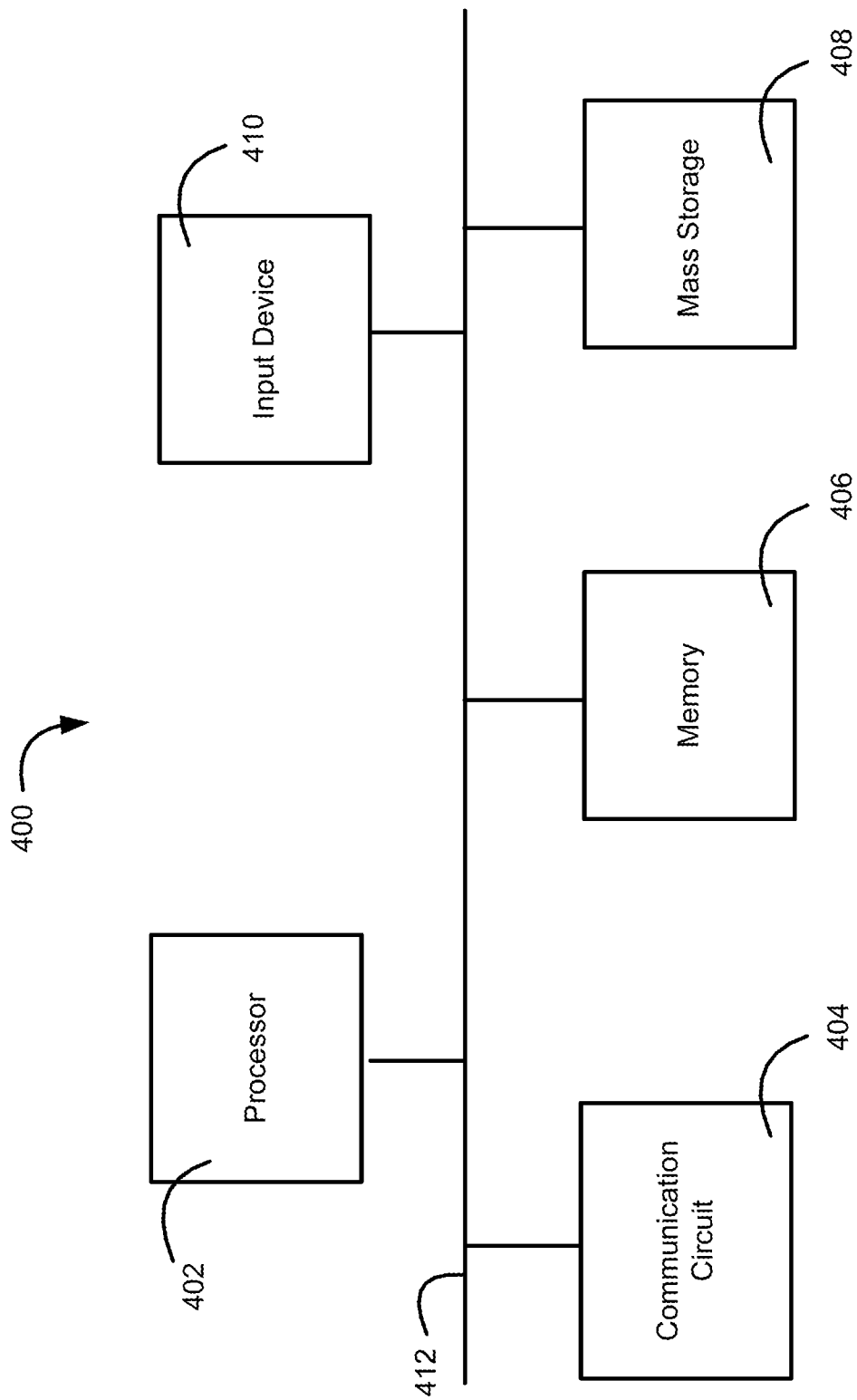
FIG. 4 is a block diagram illustrating example components of an apparatus that may be configured to perform one or more of the tasks described herein.

The systems, methods, and/or instrumentalities described herein may be implemented using one or more processors, one or more storage devices, and/or other suitable accessory devices such as display devices, communication devices, input/output devices, etc. FIG. 4 illustrates an example apparatus 400 (e.g., the processing unit 108 of FIG. 1) that may be configured to perform the tasks described herein. As shown, apparatus 400 may include a processor (e.g., one or more processors) 402, which may be a central processing unit (CPU), a graphics processing unit (GPU), a microcontroller, a reduced instruction set computer (RISC) processor, application specific integrated circuits (ASICs), an application-specific instruction-set processor (ASIP), a physics processing unit (PPU), a digital signal processor (DSP), a field programmable gate array (FPGA), or any other circuit or processor capable of executing the functions described herein. Apparatus 400 may further include a communication circuit 404, a memory 406, a mass storage device 408, an input device 410, and/or a communication link 412 (e.g., a communication bus) over which the one or more components shown in the figure may exchange information.

Communication circuit 404 may be configured to transmit and receive information utilizing one or more communication protocols (e.g., TCP/IP) and one or more communication networks including a local area network (LAN), a wide area network (WAN), the Internet, a wireless data network (e.g., a Wi-Fi, 3G, 4G/LTE, or 5G network). Memory 406 may include a storage medium (e.g., a non-transitory storage medium) configured to store machine-readable instructions that, when executed, cause processor 402 to perform one or more of the functions described herein. Examples of the machine-readable medium may include volatile or non-volatile memory including but not limited to semiconductor memory (e.g., electrically programmable read-only memory (EPROM), electrically erasable programmable read-only memory (EEPROM)), flash memory, and/or the like. Mass storage device 408 may include one or more magnetic disks such as one or more internal hard disks, one or more removable disks, one or more magneto-optical disks, one or more CD-ROM or DVD-ROM disks, etc., on which instructions and/or data may be stored to facilitate the operation of processor 402. Input device 410 may include a keyboard, a mouse, a voice-controlled input device, a touch sensitive input device (e.g., a touch screen), and/or the like for receiving user inputs to apparatus 400.

It should be noted that apparatus 400 may operate as a standalone device or may be connected (e.g., networked or clustered) with other computation devices to perform the tasks described herein. And even though only one instance of each component is shown in FIG. 4, a skilled person in the art will understand that apparatus 400 may include multiple instances of one or more of the components shown in the figure.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure. In addition, unless specifically stated otherwise, discussions utilizing terms such as "analyzing," "determining," "enabling," "identifying," "modifying" or the like, refer to the actions and processes of a computer system, or similar electronic computing device, that manipulates and transforms data represented as physical (e.g., electronic) quantities within the computer system's registers and memories into other data represented as physical quantities within the computer system memories or other such information storage, transmission or display devices.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A system, comprising:
 a sensing device configured to be attached to a medical device in a medical environment and capture at least a first image of a person in the medical environment while the medical device is in a first position, the sensing device further configured to capture a second image of the person while the medical device is in a second position; and
 a processing unit configured to:
  obtain the first image and the second image captured by the sensing device;
  identify a first set of body keypoints of the person from the first image;
  identify a second set of body keypoints of the person in the second image; and
  generate a human model of the person based on at least the first set of body keypoints of the person, the second set of body keypoints of the person, and the first position of the medical device in the medical environment, wherein the human model indicates a pose and a body shape of the person in the medical environment.

2. The system of claim 1, wherein the medical device comprises a medical imaging device.

3. The system of claim 1, wherein the human model includes parameters determined based on a coordinate system associated with the medical environment.

4. The system of claim 3, wherein the processing unit being configured to generate the human model of the person comprises the processing unit being configured to determine three-dimensional (3D) coordinates of the first set of body keypoints in the coordinate system associated with the medical environment.

5. The system of claim 4, wherein the 3D coordinates of the first set of body keypoints are determined based at least on respective locations of the first set of body keypoints in the first image and the first position of the medical device in the medical environment.

6. The system of claim 1, wherein the processing unit is further configured to receive information regarding the medical device and determine the first position of the medical device in the medical environment based on the received information.

7. The system of claim 1, wherein the processing unit is further configured to generate, based on the human model of the person, instructions for adjusting the medical device or a position of the person.

8. The system of claim 1, wherein the processing unit is configured to implement a machine learning model for identifying the first set of body keypoints of the person and generating the human model of the person.

9. The system of claim 1, wherein the human model comprises a three-dimensional human mesh.

10. The system of claim 1, wherein the sensing device comprises a camera, a depth sensor, or a non-visible-light sensor.

11. A method for human model recovery, the method comprising:
 obtaining a first image of a person captured by a sensing device attached to a medical device in a medical environment, wherein the first image of the person is captured while the medical device is in a first position;
 obtaining a second image of the person captured by the sensing device, wherein the second image of the person is captured while the medical device is in a second position;
 identifying a first set of body keypoints of the person in the first image;
 identify a second set of body keypoints of the person in the second image; and
 generating a human model of the person based on at least the first set of body keypoints of the person, the second set of body keypoints of the person, and the first position of the medical device in the medical environment, wherein the human model indicates a pose and a body shape of the person in the medical environment.

12. The method of claim 11, wherein the medical device comprises medical imaging device.

13. The method of claim 11, wherein generating the human model of the person comprises determining three-dimensional (3D) coordinates of the first set of body keypoints in a coordinate system associated with the medical environment.

14. The method of claim 13, wherein the 3D coordinates of the first set of body keypoints are determined based at least on respective locations of the first set of body keypoints in the first image and the first position of the medical device in the medical environment.

15. The method of claim 11, further comprising receiving information regarding the medical device and determining the first position of the medical device in the medical environment based on the received information.

16. The method of claim 11, further comprising generating, based on the human model of the person, instructions for adjusting the medical device or a position of the person.

17. The method of claim 11, wherein the human model comprises a three-dimensional human mesh and wherein the sensing device comprises a camera, a depth sensor, or a non-visible-light sensor.

18. A non-transitory computer-readable medium comprising instructions that, when executed by a processor included in a computing device, cause the processor to:

obtain a first image of a person captured by a sensing device, wherein the sensing device is configured to be attached to a medical device in a medical environment and to capture the first image of the person while the medical device is in a first position;

obtaining a second image of the person captured by the sensing device, wherein the second image of the person is captured while the medical device is in a second position;

identify a first set of body keypoints of the person in the first image;

identify a second set of body keypoints of the person in the second image; and generate a human model of the person based on at least the first set of body keypoints of the person, the second set of body keypoints of the person, and the first position of the medical device in the medical environment, wherein the human model indicates a pose and a body shape of the person in the medical environment.

* * * * *